(12) United States Patent
Davis et al.

(10) Patent No.: US 10,088,049 B2
(45) Date of Patent: Oct. 2, 2018

(54) THERMALLY PROTECTED SEAL ASSEMBLY

(71) Applicant: United Technologies Corporation, Hartford, CT (US)

(72) Inventors: Timothy M. Davis, Kennebunk, ME (US); Michael S. Stevens, Alfred, ME (US)

(73) Assignee: United Technologies Corporation, Farmington, CT (US)

( * ) Notice: Subject to any disclaimer, the term of this patent is extended or adjusted under 35 U.S.C. 154(b) by 289 days.

(21) Appl. No.: 14/704,634

(22) Filed: May 5, 2015

(65) Prior Publication Data

US 2016/0084099 A1 Mar. 24, 2016

Related U.S. Application Data

(60) Provisional application No. 61/989,307, filed on May 6, 2014.

(51) Int. Cl.
*F16J 15/08* (2006.01)
*F01D 11/00* (2006.01)

(52) U.S. Cl.
CPC ......... *F16J 15/0887* (2013.01); *F01D 11/003* (2013.01); *F05D 2240/11* (2013.01); *F05D 2240/15* (2013.01); *F05D 2250/75* (2013.01); *Y02T 50/672* (2013.01)

(58) Field of Classification Search
CPC ......... F01D 11/00; F01D 11/005; F16J 15/08; F16J 15/0887; F16J 15/0881; F16J 15/0061; F16J 15/061; F16J 15/06; F16J 15/062

USPC .......... 415/134, 135, 139; 277/647
See application file for complete search history.

(56) References Cited

U.S. PATENT DOCUMENTS

| | | | | |
|---|---|---|---|---|
| 3,857,572 | A * | 12/1974 | Taylor | F16J 15/0887 277/609 |
| 4,199,151 | A * | 4/1980 | Bartos | F01D 11/005 277/306 |
| 4,384,822 | A | 5/1983 | Schweikl | |
| 4,474,379 | A | 10/1984 | Holzer | |
| 4,686,823 | A | 8/1987 | Coburn | |
| 5,114,163 | A | 5/1992 | Radosav | |
| 5,553,999 | A * | 9/1996 | Proctor | F01D 11/08 415/134 |
| 6,318,736 | B1 * | 11/2001 | Halling | F16J 15/0887 277/603 |
| 6,942,445 | B2 | 9/2005 | Morris | |

(Continued)

OTHER PUBLICATIONS

Parker, "Sealing & Shielding Capabilities Guide", downloaded from <http://www.parker.com/literature/Seal%20Group/PSG%205000.pdf>, 2014.

(Continued)

*Primary Examiner* — Richard Edgar
(74) *Attorney, Agent, or Firm* — O'Shea Getz P.C.

(57) ABSTRACT

A seal assembly that may be for turbine engine includes first and second rings with a convoluted seal resiliently compressed there-between. The seal may define a gap for receipt of a thermally resistant shield that may also reduce wear of the seal. The seal may include a hole for the flow of cooling air and the shield may be porous so as not to obstruct the cooling air flow for cooling of the seal.

16 Claims, 4 Drawing Sheets

(56) References Cited

U.S. PATENT DOCUMENTS

| | | | |
|---|---|---|---|
| 7,090,224 B2* | 8/2006 | Iguchi | F01D 11/005 277/603 |
| 7,699,320 B2* | 4/2010 | Iguchi | F01D 11/005 277/604 |
| 8,661,828 B2* | 3/2014 | Pieussergues | F01D 9/023 277/379 |
| 2006/0255549 A1 | 11/2006 | Amos | |
| 2012/0073299 A1 | 3/2012 | Bleeker | |
| 2014/0241863 A1 | 8/2014 | Tardif | |
| 2015/0135720 A1 | 5/2015 | Papple | |

OTHER PUBLICATIONS

L.P. Ludwig, "Sealing Technology for Aircraft Gas Turbine Engines", NASA Technical Memorandum NASA TM X-71607, 10th Propulsion Conference sponsored by the AIAA and SAE, San Diego, California, Oct. 21-24, 1974.

Parker, "Metal Seal Design Guide", downloaded from <http://www.parker.com/literature/Seal%20Group/CSS%205129.pdf>, 2013.

* cited by examiner

THERMALLY PROTECTED SEAL ASSEMBLY

This application claims priority to U.S. Patent Appln. No. 61/989,307 filed May 6, 2014.

BACKGROUND

The present disclosure relates to a seal assembly and, more particularly, to a thermally protected seal assembly for a turbine engine.

A turbine engine includes a plurality of seals of varying sizes and shapes to control leakage and gas flow. Many of the seals seal gaps between parts that may be exposed to hot air temperatures and temperature differentials that cause thermal displacement. Accordingly, any seal is required to seal against undesired leakage, but also accommodate relative movement between parts. Moreover, each seal should provide a level of durability capable of withstanding wear encountered as a result of relative movement, vibration and high temperature.

SUMMARY

A seal assembly according to one, non-limiting, embodiment of the present invention includes a first surface; a second surface; a seal resiliently compressed between the first and second surfaces, the seal having a convoluted segment defining a gap; and a shield located in the gap.

Additionally to the foregoing embodiment, the seal is at least in-part W-shaped.

In the alternative or additionally thereto, in the foregoing embodiment, the shield is porous.

In the alternative or additionally thereto, in the foregoing embodiment, the shield is compliant.

In the alternative or additionally thereto, in the foregoing embodiment, the first and second surfaces are annular and the seal longitudinally extends circumferentially with respect to an axis.

In the alternative or additionally thereto, in the foregoing embodiment, the first surface is carried by a BOAS ring and the second surface is carried by a vane assembly disposed concentrically to the axis which is an engine axis.

In the alternative or additionally thereto, in the foregoing embodiment, the first and second surfaces are annular, and the seal and shield extend circumferentially.

In the alternative or additionally thereto, in the foregoing embodiment, the convoluted segment includes a first bend, a first member and a second member with the first bend extending between the first and second members and the first and second members projecting outward from the first bend in a substantially same first direction.

In the alternative or additionally thereto, in the foregoing embodiment, the seal includes a third member and a second bend connected to and extending between the second and third members with the third member substantially projecting in a second direction opposite the first direction and being in biased sealing contact with the second surface.

In the alternative or additionally thereto, in the foregoing embodiment, the third member includes a hole for cooling fluid flow.

In the alternative or additionally thereto, in the foregoing embodiment, the seal includes a fourth member and a third bend connected to and extending between the first and fourth members with the fourth member substantially projecting in the second direction and being in biased sealing contact with the first surface.

In the alternative or additionally thereto, in the foregoing embodiment, the first surface is annular and carried by a BOAS ring and the second surface is annular and carried by a vane assembly, and the first direction is generally radially inward and the second direction is generally radially outward with respect to an engine axis.

In the alternative or additionally thereto, in the foregoing embodiment, the seal is disposed between a secondary cooling flowpath and a core flowpath.

In the alternative or additionally thereto, in the foregoing embodiment, the shield is generally porous and exposed to the core flowpath.

In the alternative or additionally thereto, in the foregoing embodiment, the shield has an L-shaped cross sectional profile with a first leg projecting at least in-part into the gap and a second leg projecting toward the first surface.

In the alternative or additionally thereto, in the foregoing embodiment, the vane assembly includes a plurality of shrouds that together carry the annular second surface and each shroud includes a lip that projects axially outward from the second surface that together forms a lip ring in contact with the seal that is compliant.

A turbine engine seal assembly according to another, non-limiting, embodiment of the present disclosure includes a first ring; a second ring spaced from the first ring, and the first and second rings being concentric to an engine axis; a seal resiliently compressed between the first and second rings; a lip ring spaced from the seal; and a shield in contact with the seal and the lip ring for thermally isolating the seal from the lip ring.

Additionally to the foregoing embodiment, the seal is convoluted and defines a gap with the shield being in-part in the gap.

In the alternative or additionally thereto, in the foregoing embodiment, the first ring is a BOAS ring and the second ring is a shroud ring of a vane assembly, and the lip ring projects axially from the shroud ring and toward the BOAS ring.

In the alternative or additionally thereto, in the foregoing embodiment, the seal is located between a secondary cooling flowpath and an engine core flowpath and includes a hole for flowing cooling air from the secondary cooling flowpath to the core flowpath to cool the seal, and the shield is porous for flow-through of the cooling air.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
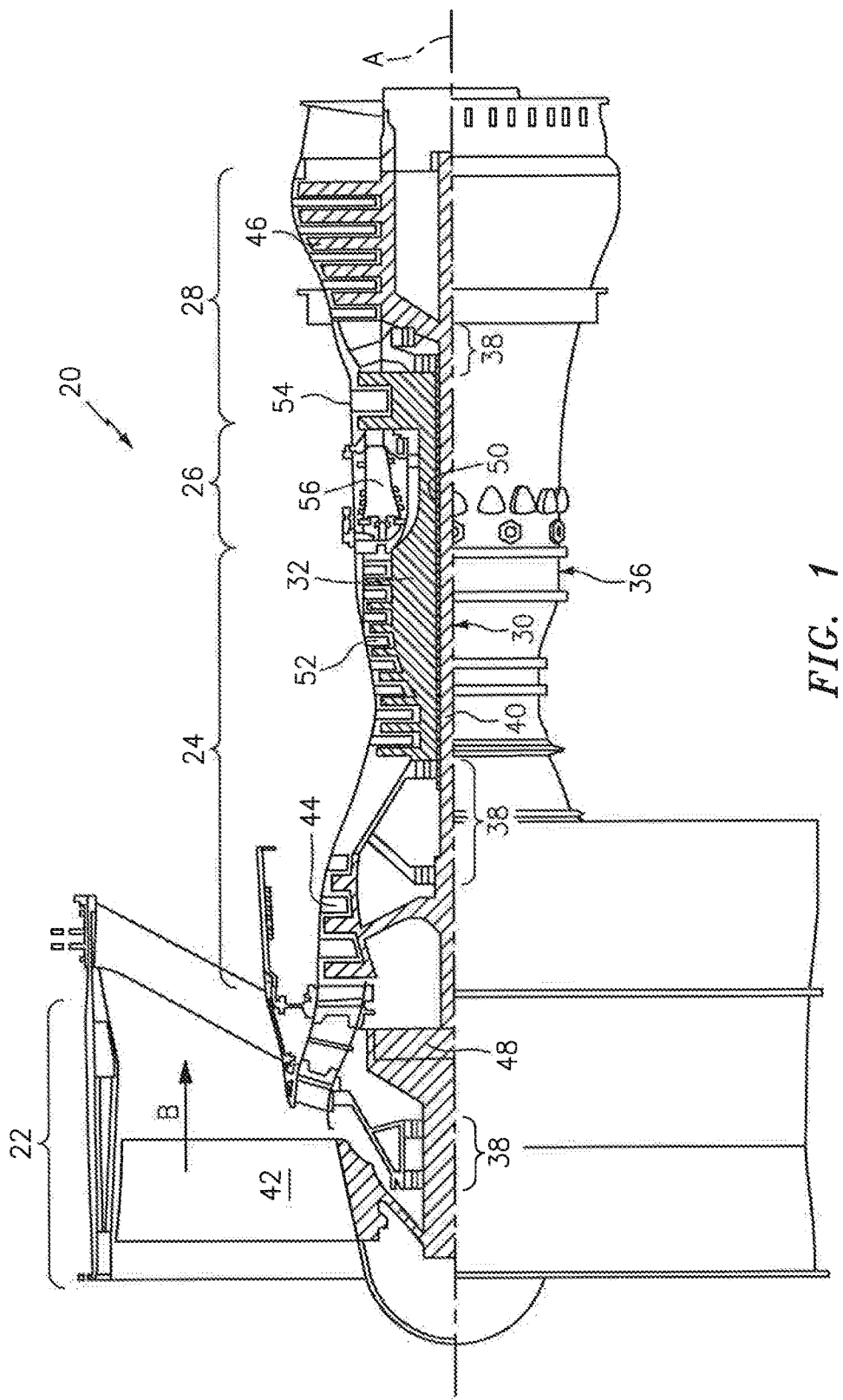
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path 'B' due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7^{0.5})$, where "T" represents the ambient temperature in degrees Rankine. The Low Corrected Fan Tip Speed according to one non-limiting example of the gas turbine engine 20 is less than about 1150 feet per second (351 meters per second).

Figure 2:
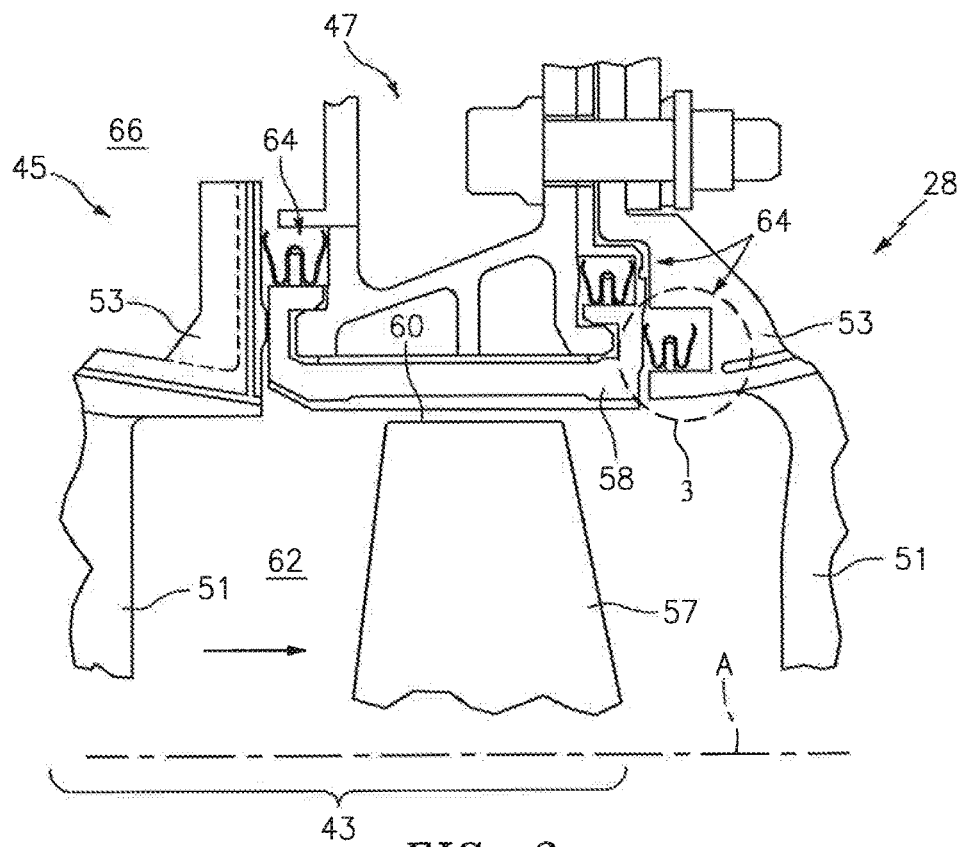
FIG. 2 is a partial sectional view of a turbine section of the engine according to one, non-limiting embodiment of the present disclosure.

Referring to FIG. 2, the turbine section 28 may include a plurality of stages 43 each having a forward, stationary, vane assembly 45 and an axially aft blade assembly 47 generally in the core flowpath. As illustrated, one complete stage 43 is shown along with a vane assembly 45 of an adjacent and downstream stage. Each vane assembly 45 has a plurality of vanes 51 spaced circumferentially from one-another and radially extending between, and supported by, circumferentially extending inner and outer shroud rings 53 disposed concentrically to engine axis A (only the outer shroud ring shown). The shroud rings 53 along with the vanes 51 may be formed as one unitary piece, or each vane 51 or any number of vanes may be formed to a segment 55 of the shroud ring 53 (see FIG. 5), that when assembled, forms a complete ring.

Each blade assembly 47 has a plurality of rotating blades 57 and a stationary shroud ring or blade outer air seal (BOAS) ring 58 that may be segmented circumferentially. The blades 57 are spaced circumferentially from one-another and project radially outward from, and engaged to, a rotor (not shown) centered to the engine axis A and to a distal tip 60 of the blade 57. The distal tip 60 is in close association with the BOAS ring 58 to minimize or eliminate any flow leakage or bypass of hot core engine air flowing (i.e. between the ring 58 and tip 60) through an engine core flowpath 62 generally defined radially between the inner and outer shroud rings 53 of the vane assemblies 45 and the BOAS ring 58 and blade platforms of the blades 57 (not shown).

Figure 3:
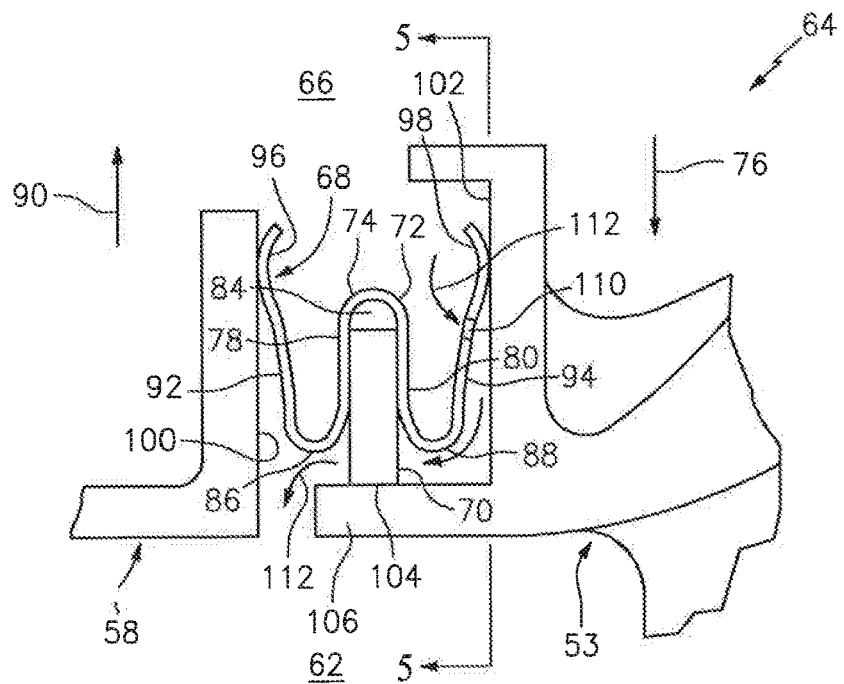
FIG. 3 is an enlarged cross section of a seal assembly taken from circle 3 of FIG. 2.

Referring to FIGS. 2 and 3, at least one annular seal assembly 64 may be located between the outer shroud ring 53 of the vane assembly 45 and the BOAS ring 58 of the blade assembly 47 for the prevention of unwanted cooling air leakage from a secondary cooling flowpath 66 (generally defined radially between the engine case 36 and the rings 53, 58) and into the hot core flowpath 62. The seal assembly 64 has an annular seal 68 for resilient and biased sealing contact between the rings 53, 58 and a thermally resistant, annular, shield 70 for positioning and thermally shielding the seal and acting as a compliant and/or sacrificial element to minimize or prevent seal wear. Both the seal 68 and the shield 70 extend circumferentially about the engine axis A.

The seal 68 may be generally W-shaped in cross section (i.e. taken along an imaginary plane that spans radially and generally contains the engine axis A) or convoluted having a convoluted segment 72 for receipt of the shield 70. The convoluted segment 72 has a central bend 74 that is concave in a radial inward direction (see arrow 76) and two inner members 78, 80 that substantially project in a radial inward direction 76 and from respective ends of the bend 74. The bend 74 and members 78, 80 generally define a gap 84 for location of a substantial portion of the shield 70. The seal 68 may further include outer bends 86, 88 that are concave in a radial outward direction (see arrow 90), and outer members 92, 94 that substantially project from the respective bends 86, 88 in the outward direction 90 and to respective distal end portions 96, 98. Outer bend 86 is thus engaged to and spans between the inner member 78 and the outer member 92, and outer bend 88 is engaged to and spans between the inner member 80 and the outer member 94.

The seal 68 may be made of a resilient metal material such that the end portion 96 of outer member 92 exerts a forward or upstream biasing force against an annular surface 100 of the seal assembly 64 carried by the BOAS ring 58, and the end portion 98 exerts an opposite rearward or downstream biasing force against an annular surface 102 carried by the shroud ring 53. Each end portion 96, 98 may be slightly cupped for ease of maintenance and for improved wear resistance as a convex side of the end portions 96, 98 press against and seal upon the respective surfaces 100, 102. Although not illustrated, the end portions 96, 98 may be further coated with an anti-wear coating to improve wear properties of the seal 68.

Figure 4:
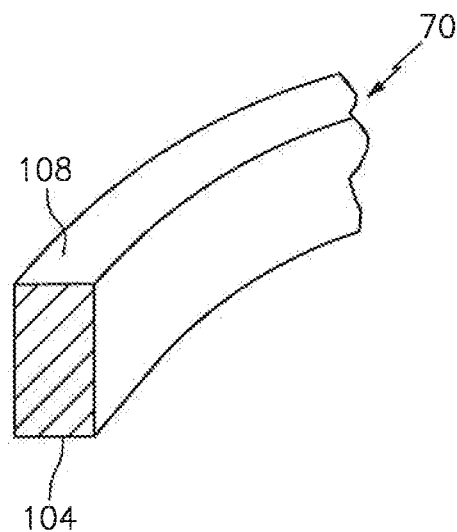
FIG. 4 is a perspective cross section of a shield of the seal assembly.

Referring to FIGS. 3 and 4, the shield 70 may be porous and compliant (e.g. compressible), may be generally ring shaped like a washer, and may be made of a woven or braided, composite ceramic fiber, such as Nextel®, by the 3M Company in Saint Paul, Minn., or other heat resistant material. The shield 70 may be generally rectangular in cross section ((i.e. taken along an imaginary plane that spans radially and generally contains the engine axis A) and secured in the gap 84 by inward biasing forces exerted by the opposing inner members 78, 80 and the resiliency of the middle bend 72. Alternatively, the inner members 78, 80 may be crimped or adhered to the shield, or the shield may be loosely fitted within the gap but trapped via adjacent structure. The shield 70 has a radially inward facing face 104 that contacts a lip ring 106 of the seal assembly 64 that may project axially outward from the surface 102 carried by the shroud ring 53, and spaced from the BOAS ring 58. An opposite face 108 carried by the shield 70 may generally face and may contact the middle bend 72. Face 108 may generally be flat in cross section or may generally conform to the concave side of the middle bend 74.

The radial distance between the opposite faces 104, 108 of the shield 70 is greater than a radial distance of the gap 84 in order to space the outer bends 86, 88 radially outward from the hot lip ring 106 for thermal protection and wear resistance. To further minimize heat exposure to the seal 68 thus enhancing seal durability, the outer member 94 may include a plurality of cooling holes 110 for the flow of cooling fluid or air (see arrow 112) from the secondary cooling flowpath 66, between the hot lip ring 106 and outer bend 88, through the porous shield 70, out through the spacing between the lip ring 106 and the BOAS ring 58, and into the hot engine core flowpath 62. The cooling holes 110 may be any form of aperture including intermittent breaks of the sealing interface between the end portion 98 of outer member 94 and the surface 102 carried by the shroud ring 53.

Figure 5:
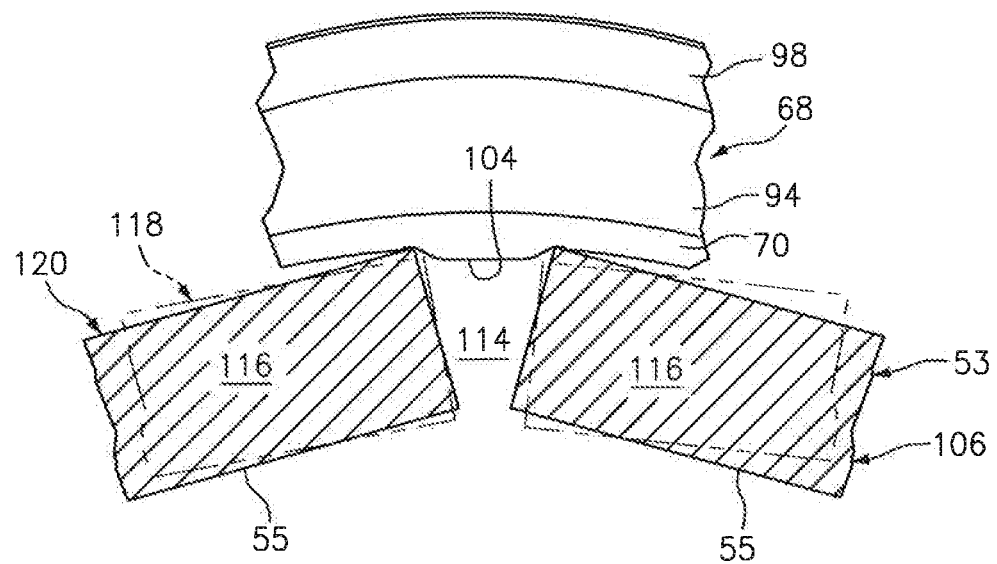
FIG. 5 is a cross section of the seal assembly taken along line 5-5 of FIG. 3.

Referring to FIGS. 3 through 5, the segments 55 of the shroud ring 53 generally meet circumferentially with adjacent segments at seams or gaps 114 (see FIG. 5). With the shroud ring 53 divided into segments 55, the lip ring 106 may, likewise, be divided into individual lips 116 at the seam 114 (i.e. one lip 116 projecting axially from each segment 55). The segments 55 are further configured to move between a cold state 118 (shown in phantom in FIG. 5) and a hot state 120 due to thermal expansion and contraction. As the adjacent lips 116 of the lip ring 106 move between the cold and hot states 118, 120, the compliant shield 70 may generally flex radially at the face 104, thereby, reducing or eliminating any stress or movement that the seal 68 may otherwise be exposed to, thus enhancing seal durability. Similarly, the shield 70 may provide vibration dampening between the surrounding structures and the seal 68.

Figure 6:
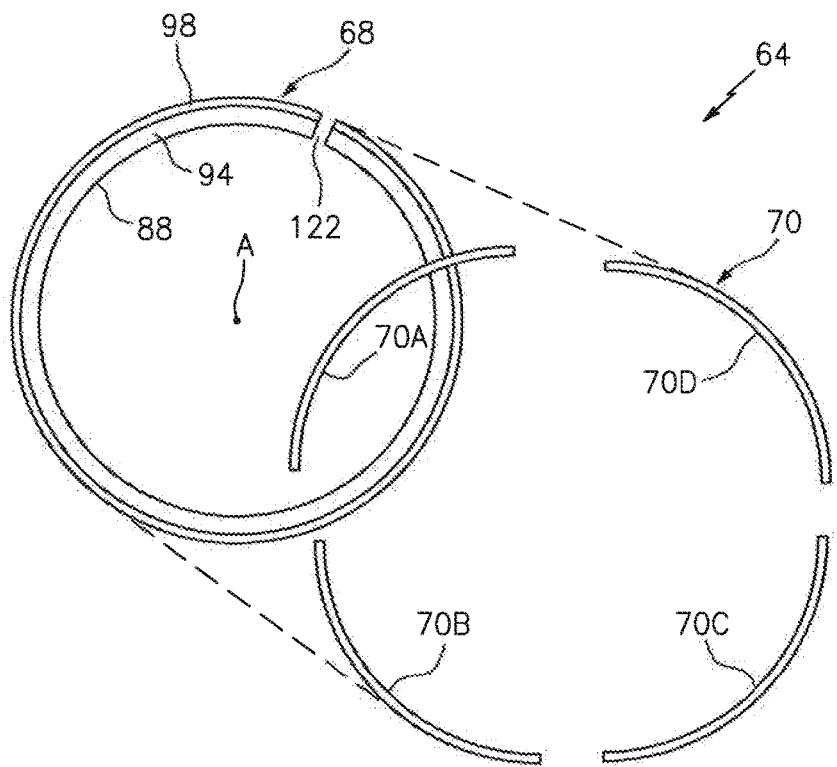
FIG. 6 is an exploded perspective view of a seal and the shield of the seal assembly.

Referring to FIG. 6, the seal 68 of the seal assembly 64 may include at least one splice or separation 122 at respective circumferential locations (one shown) for adjusting to thermal expansion and contraction. The splice 122 may be generally sealed by any number of techniques known in the art. The shield 70 may be divided circumferentially into a plurality of segments 70A, 70B, 70C, 70D (four shown) for ease of assembly and insertion into the gap 84 (see FIG. 3).

Figures 7, 8:
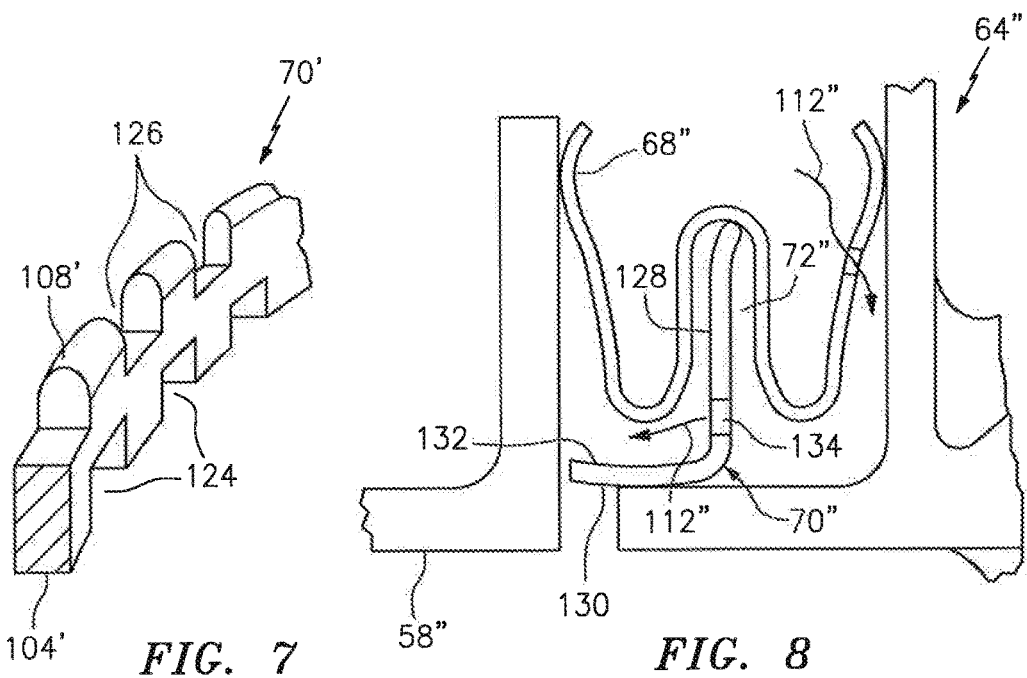
FIG. 7 is a perspective cross section of a second embodiment of the shield.
FIG. 8 is a cross section of a third embodiment of the seal assembly similar in perspective to FIG. 3.

Referring to FIG. 7, a second embodiment of the shield is illustrated wherein like elements to the first embodiment have like identifying numerals except with the addition of a prime symbol. In the second embodiment, a porosity of a shield 70' may be inherent to the braided structure of the seal material, and/or, the seal may have intermittent cut-outs or inner apertures 124 that serve to pass the cooling air 112'. Each inner aperture 124 may be distributed circumferentially from one-another and communicate through a face 104' and the opposing sides of the shield 70'. The inner apertures 124 may further serve to reduce weight of the shield and reduce conductive heat load into the seal. Similarly, and also to reduce weight and reduce heat load, the shield 70' may have a plurality of outer apertures 126 distributed circumferentially from one-another, communicating through a face 108' and opposing sides of the shield 70', and being circumferentially offset from the inner apertures 124.

Referring to FIG. 8, a third embodiment of the seal assembly is illustrated wherein like elements to the first embodiment have like identifying numerals except with the addition of a prime symbol. In the third embodiment, a shield 70" of a seal assembly 64" may be made of a metal material or other material of high temperature resistance, low-strength, and with wear resistant traits. The shield 70" may generally be L-shaped in cross section, having a first leg 128 projecting radially outward into a gap 72" generally defined by a seal 68" and a second leg 130 projecting substantially axially forward from an end of the first leg 128 and toward a BOAS ring 58". A distal end 132 of the second leg 130 is in close proximity to the BOAS ring 58" so as to block-off any appreciable direct-line-of-site of a the seal 68" and thereby minimize exposure of the seal 68" to the hot air of a engine core flow path 62". The first leg 128 may further have a plurality of cooling holes 134 for flow of cooling air (see arrow 112") through the shield 70". Although not illustrated, and if the distal end 132 is in contact with the ring 58, the second leg 130 of the shield 70" may further include holes or slots for the passage of cooling air.

It is further contemplated and understood that any number of components of the present invention may be reversed. That is, the lip ring 106 may project from the BOAS ring 58 instead of the shroud ring 53. In such an embodiment, the cooling hole 110 may be in the upstream outer member 92 instead of the downstream member 94 of the seal 68. Moreover, the BOAS and shroud rings 58, 53 may be any circumferentially extending structure or rings in the turbine engine 20. Furthermore, the seal assembly 64 may not extend circumferentially, and instead may be linear or any longitudinal shape to provide sealing between two structures having substantially opposing surfaces.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed:

1. A seal assembly comprising:
   a first surface;
   a second surface;
   a seal resiliently compressed between the first and second surfaces, the seal having a convoluted segment defining a gap;
   a lip ring; and
   a shield located in the gap and in contact with the seal and the lip ring for isolating the seal from the lip ring,
   wherein the convoluted segment includes a first bend, a first member and a second member with the first bend extending between the first and second members and the first and second members projecting outward from the first bend in a substantially same first direction,
   wherein the gap is defined by the first bend, the first member and the second member, and
   wherein the shield is porous.

2. The seal assembly set forth in claim 1, wherein the seal is at least in-part W-shaped.

3. The seal assembly set forth in claim 1, wherein the shield is compliant.

4. The seal assembly set forth in claim 1, wherein the first and second surfaces are annular and the seal longitudinally extends circumferentially with respect to an axis.

5. The seal assembly set forth in claim 4, wherein the first surface is carried by a BOAS ring and the second surface is carried by a vane assembly disposed concentrically to the axis which is an engine axis.

6. The seal assembly set forth in claim 1, wherein the first and second surfaces are annular, and the seal and shield extend circumferentially.

7. The seal assembly set forth in claim 1, wherein the seal includes a third member and a second bend connected to and extending between the second and third members with the third member substantially projecting in a second direction opposite the first direction and being in biased sealing contact with the second surface.

8. The seal assembly set forth in claim 7, wherein the third member includes a hole for cooling fluid flow.

9. The seal assembly set forth in claim 7, wherein the seal includes a fourth member and a third bend connected to and extending between the first and fourth members with the fourth member substantially projecting in the second direction and being in biased sealing contact with the first surface.

10. The seal assembly set forth in claim 9, wherein the first surface is annular and carried by a BOAS ring and the second surface is annular and carried by a vane assembly, and the first direction is generally radially inward and the second direction is generally radially outward with respect to an engine axis.

11. The seal assembly set forth in claim 10, wherein the seal is disposed between a secondary cooling flowpath and a core flowpath.

12. The seal assembly set forth in claim 11, wherein the shield is exposed to the core flowpath.

13. The seal assembly set forth in claim 12, wherein the shield has an L-shaped cross sectional profile with a first leg projecting at least in-part into the gap and a second leg projecting toward the first surface.

14. The seal assembly set forth in claim 11, wherein the vane assembly includes a plurality of Shrouds that together carry the annular second surface and each shroud includes a lip that projects axially outward from the second surface that together forms the lip ring in contact with the seal that is compliant.

15. A turbine engine seal assembly comprising:
    a first ring;
    a second ring spaced from the first ring, and the first and second rings being concentric to an engine axis;
    a seal resiliently compressed between the first and second rings;
    a lip ring spaced from the seal; and
    a shield in contact with the seal and the lip ring for isolating the seal from the lip ring,
    wherein the seal includes a convoluted segment,
    wherein the convoluted segment includes a first bend, a first member and a second member with the first bend extending between the first and second members and the first and second members projecting outward from the first bend in a. substantially radial direction,
    wherein a gap is defined by the first bend, the first member and the second member,
    wherein the shield is located in-part in the gap,
    wherein the first ring is a BOAS ring and the second ring is a shroud ring of a vane assembly, and the lip ring projects axially from the shroud ring and toward the BOAS ring, and
    wherein the seal is located between a secondary cooling flowpath and an engine core flowpath and includes a hole for flowing cooling air from the secondary cooling flowpath to the core flowpath to cool the seal, and the shield is porous for flow-through of the cooling air.

16. A seal assembly comprising:
    a first surface;
    a second surface;
    a seal resiliently compressed between the first and second surfaces, the seal having a convoluted segment defining a gap;

a lip ring; and a shield located in the gap and in contact with the seal and the lip ring for isolating the seal from the lip ring, wherein the convoluted segment includes a first bend, a first member and a second member with the first bend extending between the first and second members and the first and second members projecting outward from the first bend in a substantially same first direction, wherein the gap is defined by the first bend, the first member and the second member, and wherein the shield is compliant.

\* \* \* \* \*